United States Patent
Koyama et al.

(10) Patent No.: US 8,731,757 B2
(45) Date of Patent: May 20, 2014

(54) CONTROL APPARATUS AND CONTROL SYSTEM

(75) Inventors: Yutaka Koyama, Oobu (JP); Hiromu Saitoh, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/580,426

(22) PCT Filed: Feb. 15, 2012

(86) PCT No.: PCT/JP2012/053564

§ 371 (c)(1),
(2), (4) Date: Aug. 22, 2012

(87) PCT Pub. No.: WO2013/121544

PCT Pub. Date: Aug. 22, 2013

(65) Prior Publication Data

US 2013/0211639 A1 Aug. 15, 2013

(51) Int. Cl.
*B60L 11/00* (2006.01)
(52) U.S. Cl.
USPC ............................................................ 701/22
(58) Field of Classification Search
USPC .............................................. 701/22; 60/286
See application file for complete search history.

(56) References Cited

U.S. PATENT DOCUMENTS

| | | | |
|---|---|---|---|
| 4,577,603 A * | 3/1986 | Murakami et al. | 123/339.17 |
| 5,522,367 A * | 6/1996 | Reuschenbach et al. | 123/492 |
| 7,905,813 B2 * | 3/2011 | Edelson et al. | 477/110 |
| 2008/0238108 A1 * | 10/2008 | Edelson et al. | 290/40 C |
| 2010/0095933 A1 | 4/2010 | Moriya et al. | |

FOREIGN PATENT DOCUMENTS

| | | |
|---|---|---|
| JP | 2006 299991 | 11/2006 |
| JP | 2008 215213 | 9/2008 |
| JP | 2008 242747 | 10/2008 |
| JP | 2008 309048 | 12/2008 |
| JP | 2009 116816 | 5/2009 |
| JP | 2011 5952 | 1/2011 |

OTHER PUBLICATIONS

Machine Translation of JP 2011-005952 published Jan. 13, 2011.*
Machine Translation of JP 2008-309048 published Dec. 25, 2008.*
International Search Report Issued Mar. 13, 2012 in PCT/JP12/53564 Filed Feb. 15, 2012.

* cited by examiner

*Primary Examiner* — Mary Cheung
*Assistant Examiner* — Anne Mazzara
(74) *Attorney, Agent, or Firm* — Oblon, Spivak, McClelland, Maier & Neustadt, L.L.P.

(57) ABSTRACT

The present invention provides a control apparatus which includes a load predicting part configured to predict, based on current load information of an engine rpm controlling part, a load of the engine rpm controlling part at a time point which is a predetermined time ahead of the present time point, the engine rpm controlling part being configured to control an engine rpm; and an engine rpm reducing part configured to reduce the engine rpm if the load predicted by the load predicting part is greater than or equal to a first threshold.

9 Claims, 12 Drawing Sheets

(a)

(b)

CONTROL APPARATUS AND CONTROL
SYSTEM

TECHNICAL FIELD

The present invention is related to a control apparatus which instructs an engine rpm (revolutions per minute).

BACKGROUND ART

Electronic control of a vehicle-mounted device such as an engine of the vehicle with an electronic control apparatus is increasingly taking place. For example, an engine ECU (Electronic Control Unit) calculates a fuel injection amount, fuel injection timing, a throttle opening rate, etc., to control the corresponding actuators. Such an electronic trend helps to achieve improvement in response to a driver's operation and fuel savings.

However, such an electronic trend tends to induce an increase in the number of tasks to be executed by one electronic control apparatus. Further, there is such a tendency that the higher the engine rpm is, the shorter the control cycle of the electronic control apparatus becomes. Thus, if the engine rpm is high, all the tasks may not be completed within a given time (this phenomenon is referred to as one of a task omission). For this reason, the electronic control apparatus sets priority of the tasks and may execute the tasks such that the task with higher priority is executed before the task with lower priority (see Patent Document 1, for example). Patent Document 1 discloses a failure detector configured such that the task with higher priority is executed with reliability in a predetermined interval while it is permitted that the task with lower priority is not executed in the predetermined interval.

However, if it is permitted that the task with lower priority is not executed as disclosed in Patent Document 1, high frequency of these permissions causes reduced drivability. Further, it is preferred that the task omission is prevented in order to optimize traveling control.

[Patent Document 1] Japanese Laid-open Patent Publication No. 2009-116816

DISCLOSURE OF INVENTION

Problem to be Solved by Invention

The present invention is made in consideration of the problem described above and is directed to provide an electronic control apparatus which reduces the task omissions even if the load of the electronic control apparatus is high.

Means to Solve the Problem

The present invention includes a load predicting part configured to predict, based on current load information of an engine rpm controlling part, a load of the engine rpm controlling part at a time point which is a predetermined time ahead of the present time point, the engine rpm controlling part being configured to control an engine rpm; and an engine rpm reducing part configured to reduce the engine rpm if the load predicted by the load predicting part is greater than or equal to a first threshold.

Advantage of the Invention

According to the present invention, it is possible to provide an electronic control apparatus which reduces the task omissions even if the load of the electronic control apparatus is high.

Figure 1:
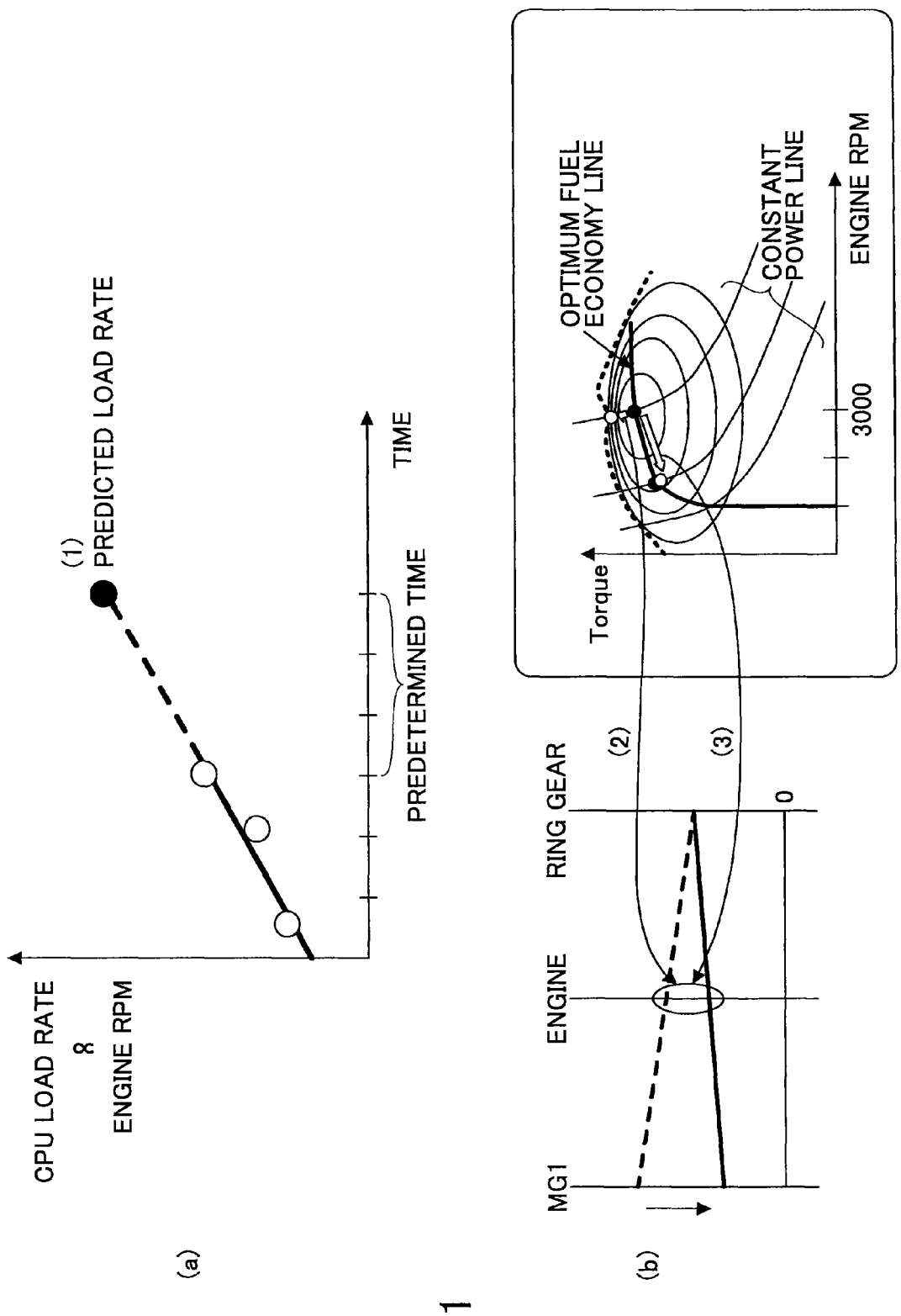
FIG. 1 is a diagram for explaining an example of an overview of control of an engine rpm by a control apparatus according to the present embodiment.

DESCRIPTION OF REFERENCE SYMBOLS 11 engine
12 power splitter
13 motor generator
14 PCU
15 battery
50 HV-ECU
51 load rate predicting part
52 target rpm determining part
60 MG-ECU
61 motor controlling part
70 engine ECU
71 load rate monitoring part
72 engine controlling part
100 control system

BEST MODE FOR CARRYING OUT THE INVENTION

FIG. 1 is a diagram for explaining an example of an overview of control of an engine rpm by a control system according to the present embodiment. It is known that a load of an engine ECU (Electronic Control Unit) increases as the engine rpm increases and a task omission occurs more easily. For this reason, the control system according to the present embodiment prevents the task omission by reducing the engine rpm while keeping vehicle speed.

(1) Since it is preferred that the engine rpm is reduced before the task omission occurs, the control system predicts the engine rpm at a time point which is a predetermined time ahead of the present time point (see predicted load rate in FIG. 1). With this arrangement, it is possible to reduce the engine rpm before the load of the engine ECU actually increases and the task omission occurs.

(2) Since a battery may be charged using rotation of the engine in a vehicle, a battery remaining amount may decrease if the engine rpm is merely reduced. Therefore, the control system reduces the engine rpm while moving an engine operating point along a constant power line. Even if the engine rpm is reduced, engine output is constant and thus a necessary charging amount of the battery with a MG1 can be reserved.

(3) Further, if the battery remaining amount is sufficient, there is a reduced need to reserve the charging amount and thus the control system reduces the engine rpm while moving an engine operating point along an optimum fuel economy line. With this arrangement, it is possible to reduce the engine rpm while keeping the optimum fuel economy even if the battery cannot be charged.

In this way, with the control system according to the present embodiment, predicting the engine rpm in the future makes it possible to reduce the engine rpm before the task omission occurs. Further, it is possible to prevent the task omission by reducing the engine rpm while protecting the battery or keeping the optimum fuel economy status.

[Example of Configuration of Hybrid Vehicle]

Figure 2:
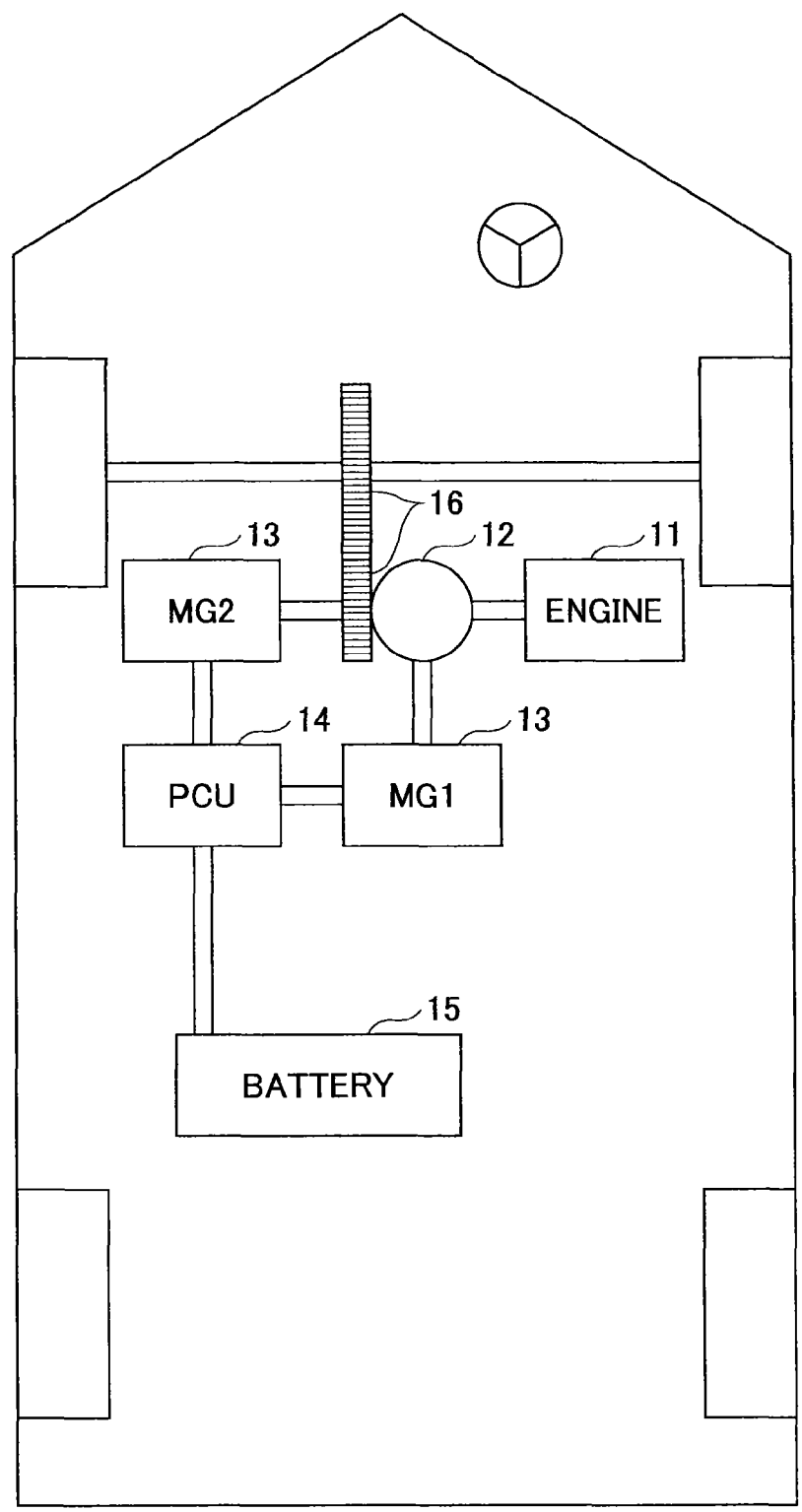
FIG. 2 is a diagram for illustrating an example of a schematic configuration of a hybrid vehicle.

FIG. 2 is a diagram for illustrating an example of a schematic configuration of a hybrid vehicle. It is noted that a plug-in hybrid vehicle is also included in a category of the hybrid vehicle. The vehicle includes an engine 11, motor generators (referred to as a MG1 and a MG2 for a distinction), a PCU (Power Control Unit) 14, a power splitter 12, a reduction gear 16 and a battery 15. It is noted that in FIG. 2 front wheels are drive wheels; however, rear wheels may be drive wheels.

A driving force of the engine 11 is transmitted to the power splitter 12 and split by the power splitter 12 to be transmitted to the reduction gear 16 and the MG1. The driving force transmitted to the reduction gear 16 rotates the front wheels and the driving force transmitted to the MG1 rotates the MG1 to generate electricity. The MG1 and MG2 are three-phase AC synchronous motors, for example. The electric power generated by the MG1 is consumed by the MG2 or accumulated in the battery 15. In other words, the PCU 14 outputs the electric power generated by the MG1 in a situation where a great driving force is necessary, and converts the electric power generated by the MG1 from AC to DC and outputs it to the battery 15 in a situation where the battery remaining amount (SOC: State Of Charge) is not sufficient.

It is noted that the MG1 functions as a starter motor at the time of starting the engine. In other words, in a situation where the driving force of the engine 11 becomes necessary, the MG1 is powered by the battery 15 via the PCU 14 to rotate to perform a cranking operation of the engine 11.

The MG 2 functions as a motor which drives the front wheels and a generator which is rotated by the rotation of the front wheels to generate electricity. When the MG2 functions as a motor, the MG2 rotates by the electric power supplied from the battery 15 via the PCU 14 or the electric power generated by the MG1. The driving force of the MG2 rotates the front wheels via the reduction gear 16. Thus, the driving force of the MG2 drives the front wheels together with the driving force of the engine 11.

At the time of decelerating the vehicle (i.e., accelerator pedal off), the PCU 14 stops supplying the electric power from the battery 15 to the MG2. Then, the MG2 is rotated by the front wheels via the reduction gear and causes the battery 15 to accumulate the generated electric power. Thus, the MG2 implements a regenerative brake which converts braking energy to electric energy.

A battery 15 is a secondary battery such as a lithium ion battery, a nickel hydrogen battery and a lead acid battery. Further, the PCU 14 includes an inverter for converting DC to AC and a converter for converting AC to DC.

Figure 3:
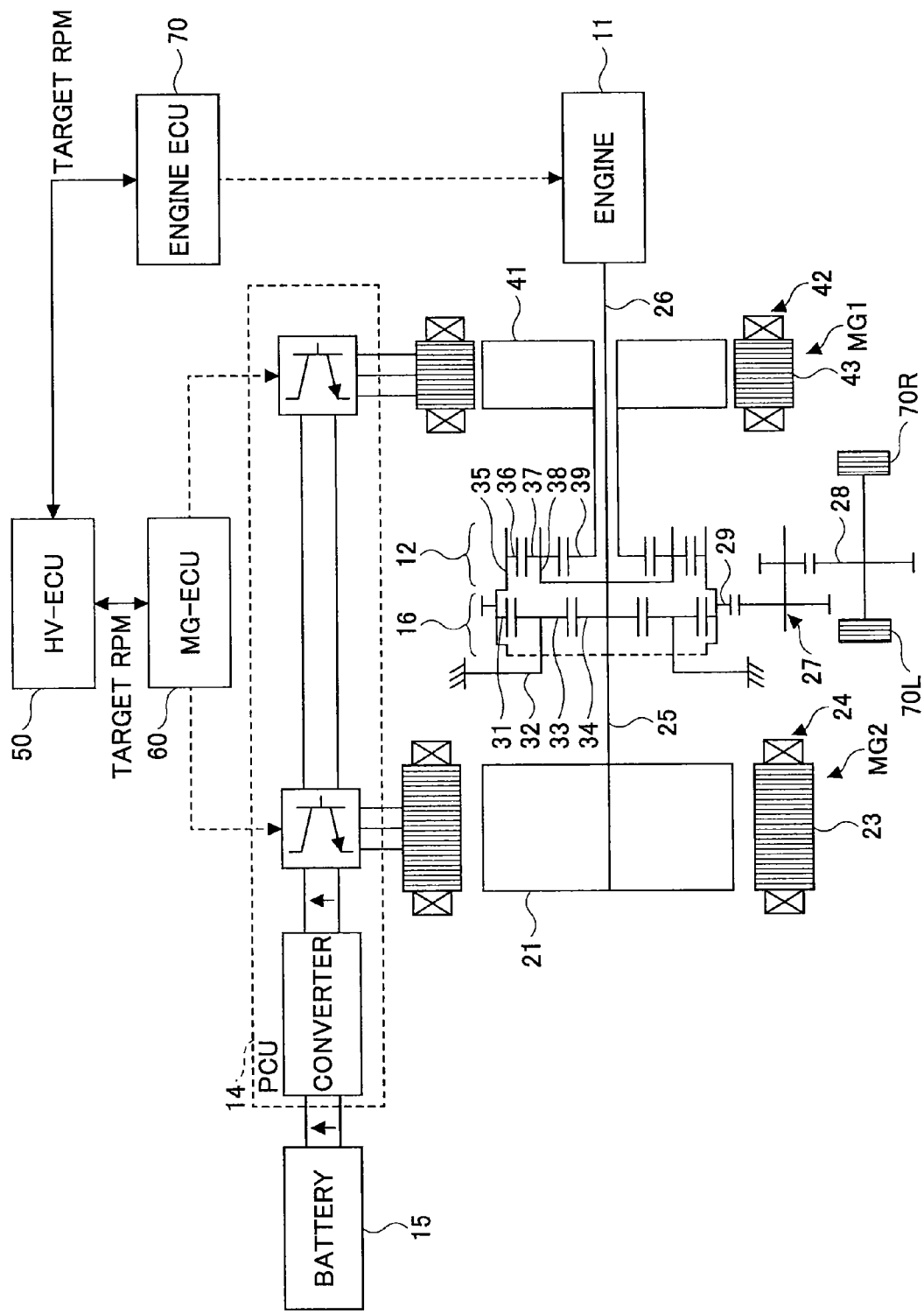
FIG. 3 is a diagram for illustrating an example of a power train of a vehicle.

FIG. 3 is a diagram for illustrating an example of a power train of a hybrid vehicle. To a differential gear 28 of the front wheels of the hybrid vehicle is coupled a power transmitting gear 27. To the power transmitting gear 27 is coupled a ring gear case 35 via a counter drive gear 29. The power splitter 12 is implemented by a planetary gear set, for example. A sun gear 39 of the planetary gear set includes a rotational axis through which a crank shaft 26 of the engine 11 passes. To the ring gear case 35 is coupled a ring gear 36. To the ring gear 36 is coupled the sun gear 39 such that the sun gear 39 can rotate around the same axis as the ring gear 36. Between the ring gear 36 and sun gear 39 are provided four pinion gears 37, for example, which rotate around the outer periphery of the sun gear 39 while rotating on their axes. The rotational axes of the respective pinion gears 37 are supported by a planetary carrier 38 to which the end of the crank shaft 26 is coupled.

The power splitter 12 has three input/output axes. Specifically, the three input/output axes include a sun gear axis which is coupled to the sun gear 39 and corresponds to the rotation axis of the MG1; the ring gear case 35 which is coupled to the ring gear 36; and the crank shaft 26 coupled to the planetary carrier 38. Once the power input to or output from the two axes of these three axes is determined, the power related to the remaining one axis and the direction (input or output) are determined.

The reduction gear 16 reduces the rotational speed of the MG2 and includes a planetary gear set as is the case with the power splitter 12. The output shaft of a rotor 21 of the MG2 is coupled to a sun gear 34 of the reduction gear 16. Further, the reduction gear 16 includes a ring gear 31 which rotates around the same axis as the sun gear 34 and together with the ring gear 36. The ring gear 31 and the sun gear 34 are engaged with four pinion gears 33, for example. The rotation of the sun gear 34 is transmitted to the ring gear 31 via the pinion gears 33. The pinion gear 33 is rotatably supported by the planetary carrier 32 which in turn is attached to a vehicle body.

The counter drive gear 29 rotates together with the ring gears 31 and 36. When the counter drive gear 29 is rotated, the front wheels are driven via the power transmitting gear 27 and the differential gear 28, because the counter drive gear 29 is coupled to the ring gear case 35. Further, the rotation of the front wheels is transmitted to the counter drive gear 29 via the power transmitting gear 27 and the differential gear 28 at the downhill.

The MG1 includes a stator 42 which generates a rotating magnetic field and a rotor 41 inside the stator 42. The rotor 41 of the MG1 is arranged such that the rotor 41 rotates around the same axis as the crank shaft 26 and the sun gear 39 of the power splitter 12. The rotor 41 rotates together with the sun gear 39. The MG2 includes a stator 24 which generates a rotating magnetic field and a rotor 21 inside the stator 24. The rotor 21 of the MG2 is arranged such that the rotor 21 rotates around the same axis as the sun gear 34 of the reduction gear 16. The rotor 41 rotates together with the sun gear 34.

The MG1 operates as a motor by an interaction between a magnetic field made by permanent magnets embedded in the rotor 14 and a rotating magnetic field generated by the stator 42. Further, the MG1 also operates as a generator in which an electromotive force at the opposite ends of a three-phase coil 43 is generated when the magnetic field made by the permanent magnets of the rotor 14 is rotated in the rotating magnetic field generated by the stator 42. The same is true for the MG2 and thus the explanation of the MG2 is omitted.

The rotation of the MG2 is transmitted to the ring gear 31 from the sun gear 34 of the reduction gear 16 via the pinion gears 33. When the ring gear 31 rotates, the rotation of the sun gear 34 rotates the ring gear case 35 which is integral with the ring gear 31 such that the rotation speed is reduced (i.e., a torque is increased) according to a ratio between the sun gear 34 and the ring gear 31. With this arrangement, the counter drive gear 29 rotates to drive the wheels.

On the other hand, the rotational force of the engine 11 is split by the power splitter 12 into the power for driving the wheels and the power for rotating the MG1. Specifically, the rotation of the crank shaft 26 rotates the planetary carrier 38 of the power splitter 12, which causes the ring case 35 to rotate via the pinion gears 37. Further, the rotation of the crank shaft 26 rotates the planetary carrier 38 of the power splitter 12, which causes the rotor 41 coupled to the sun gear 39 to rotate via the pinion gears 37.

In the hybrid vehicle, a traveling mode is controlled mainly by a HV-ECU 50 such that it is switched between an engine traveling mode, a motor traveling mode, a regenerating mode, etc. The HV-ECU 50 corresponds to a control apparatus in claims. An engine ECU 70 and a MG-ECU 60 obtain control instructions from the HV-ECU 50 to control the corresponding apparatuses such as the engine, the MG1, the MG2, etc. It is noted that functions of the HV-ECU 50 and the engine ECU 70 may be installed in one ECU, and it does not matter which function is installed in which ECU.

Specifically, the HV-ECU 50 receives an accelerator opening rate detected by an accelerator opening rate sensor, vehicle speed information obtained by a vehicle speed sensor, an on/off signal of a stop lamp switch, and a state of charge (SOC) of the battery 15. The HV-ECU 50 determines whether it is necessary to start the engine or drive the MG1 or the MG2, and determines a target rpm of the engine 11 and target rpms of the MG1 and the MG2.

For example, the HV-ECU 50 refers to a map, in which values of a demand torque according to the values of the accelerator opening rate and the values of the vehicle speed are recorded, to determine the demand torque based on the accelerator opening rate and the vehicle speed. The HV-ECU 50 controls the operations of the engine 11, the MG1 and the MG2 such that the driving force according to the demand torque is output to the ring gears 31 and 36.

The HV-ECU 50 drives only the MG2 when the demand torque falls in a low range. When the demand torque falls in a relatively high range in which the engine efficiency is good, the HV-ECU 50 drives the MG2 to assist the engine 11 whose driving force is mainly used. If the HV-ECU 50 determines, based on the demand torque, that the output of the engine 11 is necessary, it determines demand power to be output by the engine 11. Then, the HV-ECU 50 determines an optimal engine operating point in terms of fuel economy, etc., using an optimum fuel economy line and a constant power line.

The optimum fuel economy line and the constant power line are described with reference to FIG. 1. The optimum fuel economy line is a curve which connects the engine operating points defined by the values of the rpm and the torque which cause the engine 11 to operate efficiently (with reduced fuel). Further, the constant power line is a curve which connects the engine operating points defined by the values of the rpm and the torque at which the engine output (=torque×rpm) becomes constant. If the demand power is determined, the constant power line with which the demand power is obtained can be uniquely determined.

The HV-ECU 50 identifies the constant power line with which the demand power is obtained and determines the engine operating point at which the constant power line intersects the optimum fuel economy line. The rpm of the engine 11, among the rpm and the torque of the engine 11 which determine the engine operating point, is the target rpm. In this way, if the target rpm of the engine 11 is determined, the engine operating point can be moved on the optimum fuel economy line.

Since the sun gear 39 of the power splitter 12 rotates together with the rotor 41 of the MG1 and the crank shaft 26 and the sun gear 39 are connected via the pinion gears 37, there is a certain relationship between the engine 11 and the MG1 (rotor). If it is assumed that a gear ratio of the power splitter 12 which splits the engine rpm such that it is transmitted to the MG1 and the front wheels is k, the relationship is expressed as follows.

$$\text{rpm of the MG1} = \{\text{engine rpm} \times (1+k) - \text{rpm of the ring gear}\}/k$$

Thus, if the engine rpm is determined, the rpm of the MG1 is determined based on the rpm of the ring gear 36. The HV-ECU 50 outputs the target rpm of the engine 11 determined based on the constant power line and the optimum fuel economy line to the engine ECU 70 as the control instruction, and outputs the target rpm of the MG1 calculated based on the engine rpm to the MG-ECU 60 as the control instruction.

Further, the HV-ECU 50 demands the MG2 to output such a torque which compensates for the shortage of the output of the engine 11 with respect to the demand torque. When the HV-ECU 50 determines the target torque of the MG2, it determines, based on the map, etc., the target rpm at which the target torque can be obtained efficiently, and outputs the target rpm to the MG-ECU 60.

The engine ECU 70 determines a fuel injection amount and a fuel injection timing with feedback control such that the engine 11 operates at the target rpm. Further, the MG-ECU 60 determines, based on a motor electrical angle and current values of a three-phase current, a PWM signal to be supplied to the inverter to control the rpms of the MG1 and MG2.

[Relationship Between the MG1, the Engine and the Ring Gear]

As described above, there is a certain relationship between the rpms of the MG1, the engine 11 and the ring gear. The relationship is described with reference to a nomographic chart. It is noted that the rpm of the MG1 represents the rpm of the sun gear 39 of the power splitter 12 and the rpm of the ring gear 36 represents a parameter uniquely related to the vehicle speed. Once two of the three rpms of the MG1, the engine 11 and the ring gear 39 are determined according to the following situations, the remaining rpm is determined. Thus, the axes on which these three rpms are located are spaced and points corresponding to these three rpms can be connected by a line in the nomographic chart.

Figure 4:
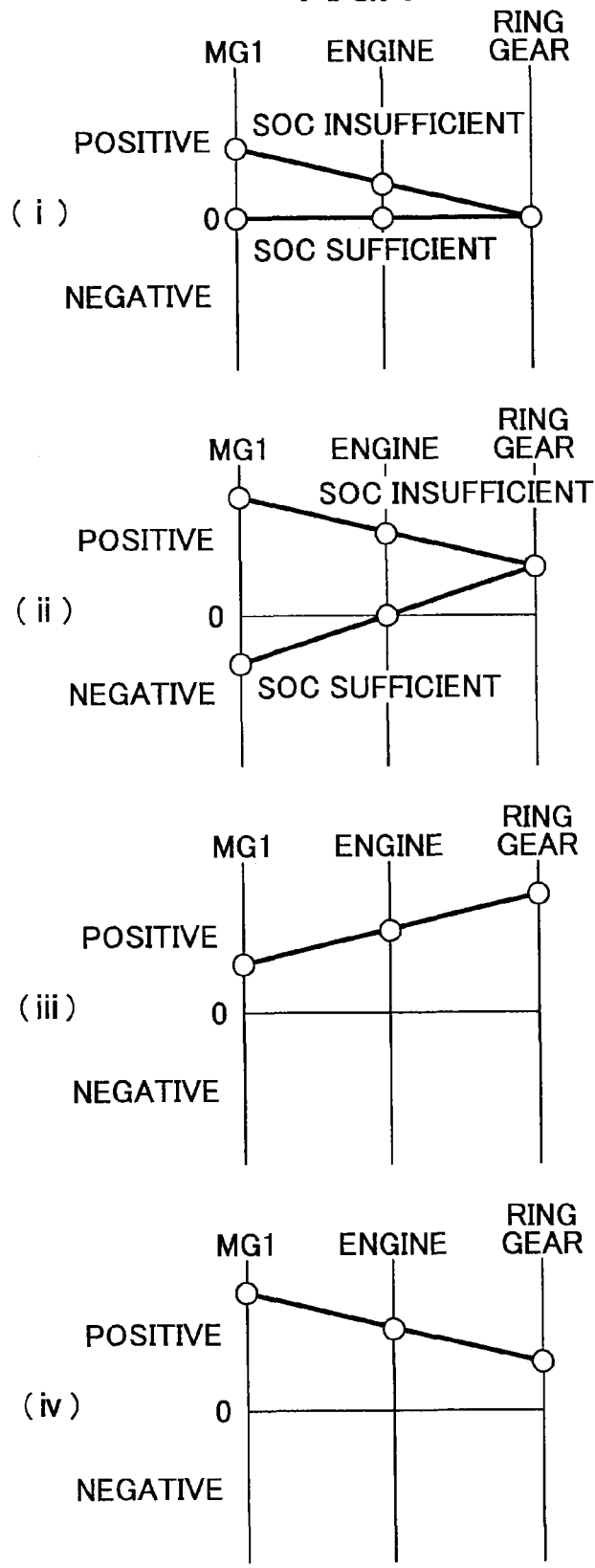
FIG. 4 is a diagram for illustrating an example of a nomographic chart.

FIG. 4 is a diagram for illustrating an example of the nomographic chart.

(i) At the time when the vehicle is not traveling;
If the SOC is sufficiently high, the engine 11 is in a stopped status. Further, the vehicle speed is zero. Thus, the rpm of the MG1 is zero.
MG1=engine=ring gear=0
If the SOC is not sufficiently high, the engine 11 is operated and the MG1 generates electricity. The rpm of the MG1 is somewhat greater than the engine rpm.
MG1=1500 engine=1000 ring gear=0

(ii) At the time when the vehicle starts to travel; If the SOC is sufficiently high, the engine 11 is not operated and the vehicle starts to travel with the driving force of the MG2 only. It is noted that a negative rpm means that the rotation direction is reversed (a positive direction corresponds to the rotation direction of the engine 11 when the vehicle travels in a forward direction.).
MG1=−250 engine=0 ring gear=500

If the SOC is not sufficiently high, the engine 11 is operated and the MG1 generates electricity.
MG1=1250 engine=1000 ring gear=500
(iii) At the time when the vehicle is traveling in a steady state; If the efficiency of the engine 11 becomes better, the vehicle is driven mainly by the engine 11. The power of the engine 11 is split such that it is transmitted to the wheels and the MG1. MG2 is driven by the electric power generated by the MG1 to assist the engine 11.
MG1=850 engine=900 ring gear=1000
(iv) At the time when the vehicle is accelerated; The engine rpm is increased, and MG2 is driven by the electric power generated by the MG1 to assist the engine 11.
MG1=1750 engine=1500 ring gear=1000

[Function of Control System of the Present Embodiment]

Figure 5:
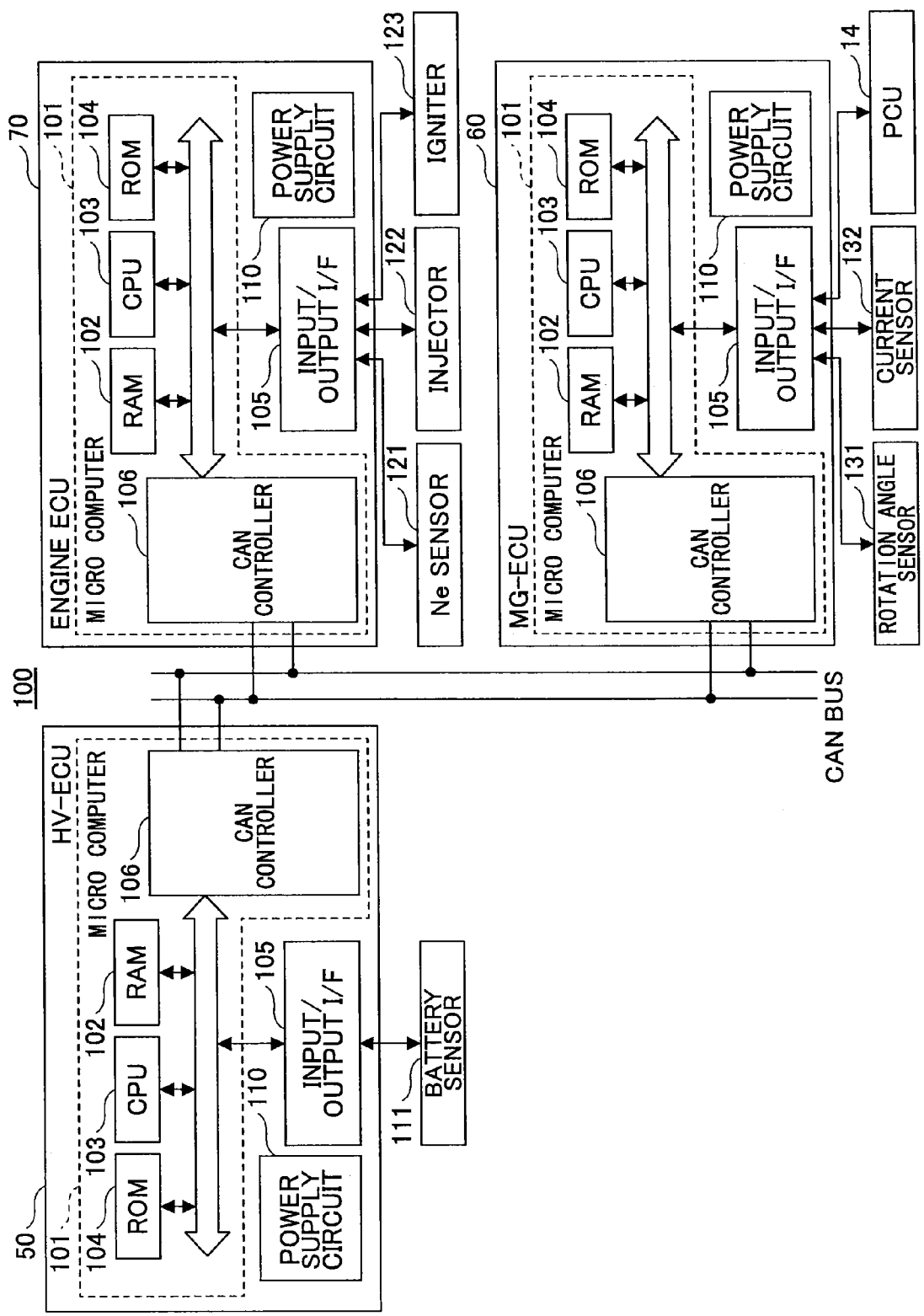
FIG. 5 is a diagram for illustrating an example of a hardware configuration of the control apparatus.
Figure 6:
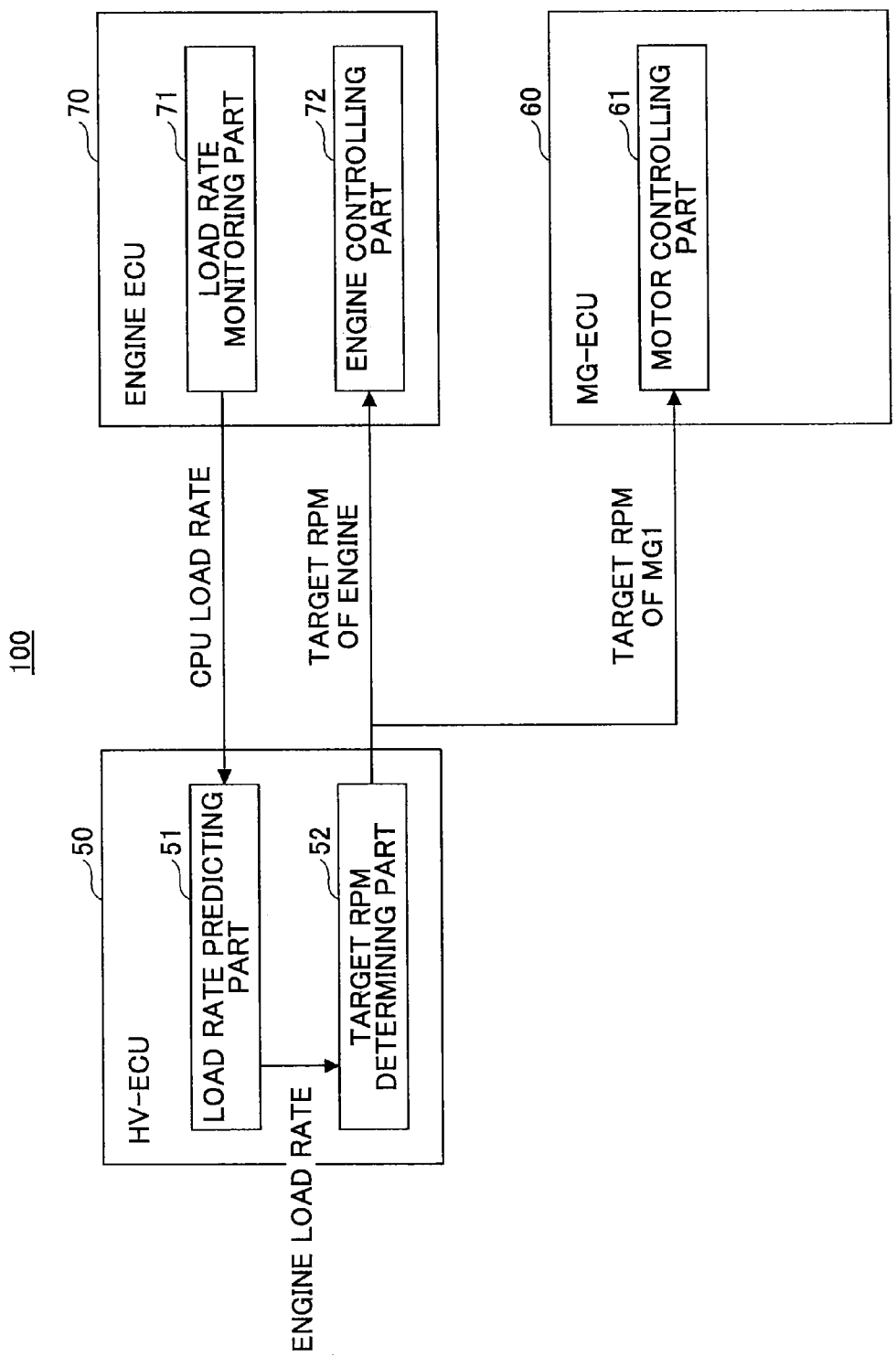
FIG. 6 is a diagram for illustrating an example of a functional block diagram of the control apparatus.

FIG. 5 is a diagram for illustrating an example of a hardware configuration of the control system 100 and FIG. 6 is a diagram for illustrating an example of a functional block diagram of the control system 100. The HV-ECU 50, the engine ECU 70 and the MG-ECU 60 are electronic control units in which a micro computer 101, an input/output I/F 105, a power supply circuit 110, etc., are installed. The micro computers 101 of the respective ECUs have CPUs 103, RAMs 104, ROMs 102, CAN controllers, etc. Other components such as WDTs (Watch Dog Timers), interrupt control circuits, I/Os, A/D converters, etc., are omitted. It is noted that every ECU does not necessarily have the same configuration.

The HV-ECU 50, the engine ECU 70 and the MG-ECU 60 are connected via a CAN (Controller Area Network) bus, for example, such that they can communicate with each other; however, a communication protocol is not limited to FrexLay, LIN or the like. The input/output I/Fs 105 of the ECUs are connected to sensors, actuators, relay circuits, etc.

To the input/output I/F 105 of the HV-ECU 50 is connected a battery sensor 111 to detect the SOC of the battery 15. Further, the HV-ECU 50 can receive various items of information such as the accelerator opening rate and vehicle speed via the CAN communications. Further, to the input/output I/F 105 of the engine ECU 70 are connected a Ne sensor 121, an injector 122 and an igniter 123. The Ne sensor 121 reports to the engine ECU 70 every time when the crank angle is increased by a predetermined amount. The injector 122 supplies the instructed amount of the fuel to a combustion chamber. The igniter 123 ignites a mixture of the fuel and air.

To the input/output I/F 105 of the MG-ECU 60 are connected a rotation angle sensor 131, a current sensor 132 and a PCU 14. The rotation angle sensors 131 are resolvers or north markers, for example, which detect the rotation angles of the MG1 and the MG2. The current sensors 132 detect currents passing through the MG1 and the MG2. The PCU 14 includes several IGBTs, for example, and functions as an inverter for converting DC current of the battery 15 to the three-phase AC and a converter for converting AC to DC, as described above.

The CPUs 103 of the ECUs execute programs stored in the ROMs 102 and cooperate with various hardware resources to implement respective functions illustrated in FIG. 6. The HV-ECU 50 includes a target rpm determining part 52 and a load rate predicting part 51. The engine ECU 70 includes an engine controlling part 72 and a load rate monitoring part 71. The MG-ECU 60 includes a motor controlling part 61.

The target rpm determining part 52 (a part of functions thereof), the engine controlling part 72 and the motor controlling part 61 are provided in the existing system. The engine controlling part 72 is woken up by a Ne sensor interrupt which is generated every predetermined crank angle by the Ne sensor 121. The engine controlling part 72 performs general engine control such as fuel injection control, ignition timing control and throttle opening rate control. The engine controlling part 72 increments a crank counter every time when the Ne sensor interrupt is reported from the Ne sensor 121. Every 30 CAs (crank angle) cause the crank counter to be incremented by one and the crank counter takes a value from 0 to 23 (0 through 690 CAs).

The engine controlling part 72 refers to a table in which tasks to be executed according to the value of the crank counter are predetermined, and performs a process according to the value of the crank counter by executing the task, waking up the task, etc. For example, the engine controlling part 72 performs processes, such as an ignition process at top dead center in a compression cycle, a fuel injection process in an exhaust cycle through a intake cycle, a process for determining a fuel injection amount before the injection, etc.

The greater the engine rpm is, the more frequently the Ne sensor interrupt is generated. Thus, the greater the engine rpm is, the greater the load of the engine ECU 70 is. The load rate monitoring part 71 monitors the load of the engine ECU 70 as a CPU load rate and transmits it to the HV-ECU 50. An example of the way of monitoring the load is described hereinafter.

In response to the instruction from the HV-ECU 50, the motor controlling part 61 of the MG-ECU 60 outputs, to the inverter of the PCU 14, the PWM signal with a duty ratio obtained by a feedback calculation such that the rpm of the MG1 or the MG2 corresponds to the target rpm.

The target rpm determining part 52 determines the target rpms of the engine 11, the MG1 and the MG2. The way of determining the target rpm of the engine 11 is described above. Further, as described above with reference to the nomographic chart, assuming that the vehicle speed (the rpm of the ring gear) is constant, if the engine rpm is determined, the rpm of the MG1 is determined correspondingly.

The load rate predicting part 51 predicts, based on the CPU load rate received by the engine ECU 70, a load rate of the engine ECU 70 at a time point which is a predetermined time ahead of the present time point. The load rate predicting part 51 outputs the predicted load rate to the target rpm determining part 52. The target rpm determining part 52 determines the target rpm of the engine 11 according to the predicted load rate as described in the present embodiment and determines the target rpm of the MG1.

It is noted that the target rpm of the MG2 is determined as follows.

At the time when the vehicle starts to travel, when the vehicle is traveling in a steady state or when the vehicle is accelerated, the target rpm of the MG2 is determined such that the target torque demanded by the driver can be obtained.

At the time when the vehicle is decelerated (accelerator pedal off), the target rpm of the MG2 is not controlled. The MG2 is driven by the driving force of the wheels to generate the electricity.

At the time when the vehicle is traveling in a backward direction, the target rpm is determined in the reversed direction with respect to the case in which the vehicle is traveling in a forward direction.

[Load of Engine ECU]

Figure 7:
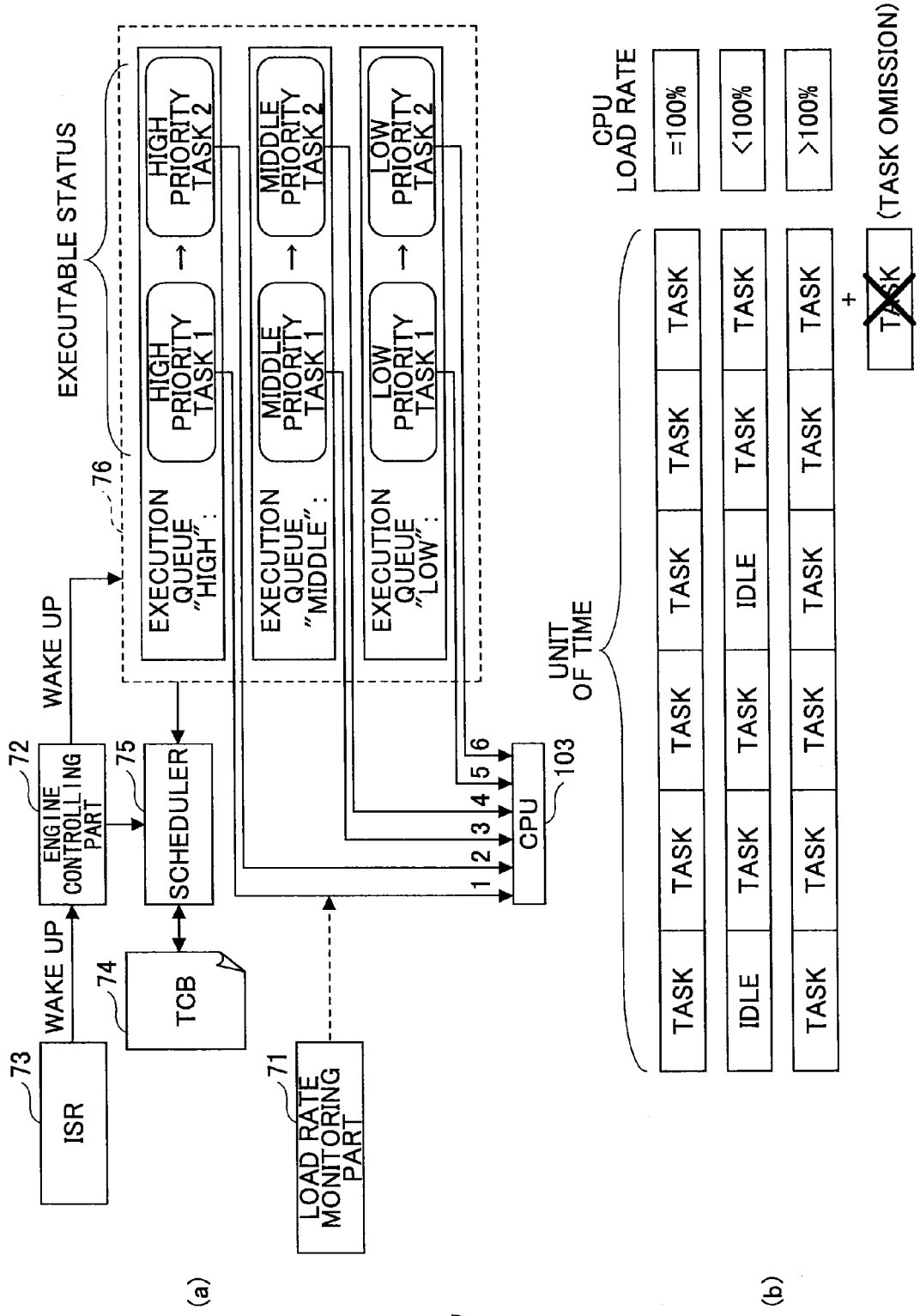
FIG. 7 is a diagram for illustrating an example of a load of an engine ECU.

FIG. 7 is a diagram for illustrating an example of a load of the engine ECU 70. The engine ECU 70 is configured such that it can perform a multiple-task process in which plural tasks are executed in a time-divisional manner. When the Ne sensor interrupt is generated, an Interrupt Service Routine (ISR) 73 wakes up the engine ECU 70. There are tasks which are woken up by timer interrupts generated by hardware resources or software resources other than the Ne sensor 121.

The ISR 73 performs a system call for functions of an Operating System (OS), for example, and wakes up the engine controlling part 72 at first, and then the engine controlling part 72 wakes up various tasks for performing processes according to the value of the crank counter. Since the engine controlling part 72, etc., calls for arguments such as a task ID, a starting address, an ending address and priority at the time of waking up, a scheduler 75, which is one of functions of the OS, registers the task ID, etc., in a Task Control Block (TCB) 74. In the TCB 74 are registered a status of the tasks and contexts (a general-purpose register, a program counter, a stack pointer, a status of a status flag, for example) in addition to these arguments.

The scheduler 75 registers the respective tasks woken up in an execution queue 76 according to the priority thereof. In the drawing, the priority of the respective tasks is classified in three levels; however, the priority may be classified in any number of the levels.

The scheduler 75 allocates the tasks to the CPU 103 in an order of priority. Specifically, the tasks in the execution queue "high" are allocated to the CPU 103 such that the task which is registered earlier is allocated earlier. Then, when there is no task in the execution queue "high", the tasks in the execution queue "middle" are allocated to the CPU 103 such that the task which is registered earlier is allocated earlier. Then, when there is no task in the execution queue "middle", the tasks in the execution queue "low" are allocated to the CPU 103 such that the task which is registered earlier is allocated earlier.

Thus, if a frequency of waking up the tasks is low, a time from a time point when the task is woken up to a time point when the task is executed by the CPU 103 becomes shorter. If there is no task in the execution queue 76, the scheduler allocates an idle task to the CPU 103. The idle task is an instruction such as a Non Operation (NOP) instruction for which the CPU 103 does not actually perform calculations, memory accesses, etc. On the other hand, if a frequency of waking up the tasks is great, a time from a time point when the task is woken up to a time point when the task is executed by the CPU 103 becomes longer. In particular, it becomes more difficult for the task with lower priority to be executed. In this case, the task may not be executed before the deadline and thus a task omission may occur.

Since the frequency of waking up the tasks tends to depend on a frequency of the Ne sensor interrupt, it can be appreciated that the greater the engine rpm becomes, the greater the frequency of waking up the tasks becomes. In the present embodiment, magnitude of the load of the engine ECU 70 is visualized as follows. It is noted that the load of the engine ECU 70 is not limited to the load of the CPU 103, and may include a usage rate of the bus; however, the load of the CPU 103 is used as a representative. It is estimated that if the load of the engine ECU 70 is high, loads of the other circuits are high.

$$\text{CPU load rate}=100\%-\text{idle rate}+\text{overload rate} \qquad (1)$$

The idle rate corresponds to the number of executions of an idle task per unit of time, and the overload rate corresponds to the number of the task omissions per unit of time. The load rate monitoring part 71 obtains an execution status of the tasks from the scheduler 75 and monitors the task executed by the CPU 103 to determine the CPU load rate.

Thus, as illustrated in FIG. 7(b), if the unit of time is fully used for the execution of the tasks (not including the idle task), the CPU load rate becomes 100%. Further, if the idle task is performed in the unit of time, the overload rate is zero and thus the CPU load rate is less than 100%.

Further, if only the tasks are executed in the unit of time but the task omission occurs, the idle rate is zero and the CPU load rate exceeds 100%. The number of the task omission is detected as follows, for example.

(a) the number of the tasks for which the unit of time has passed without being executed since they are woken up.

(b) If the maximum number of the tasks which can be executed in the unit of time is Max and the number of the tasks which are registered in the execution queue in the unit of time is N, "N-MAX" is determined as the number of the task omissions.

The load rate monitoring part 71 transmits the CPU load rate thus calculated to the HV-ECU 50 via the CAN bus.

Figure 8:
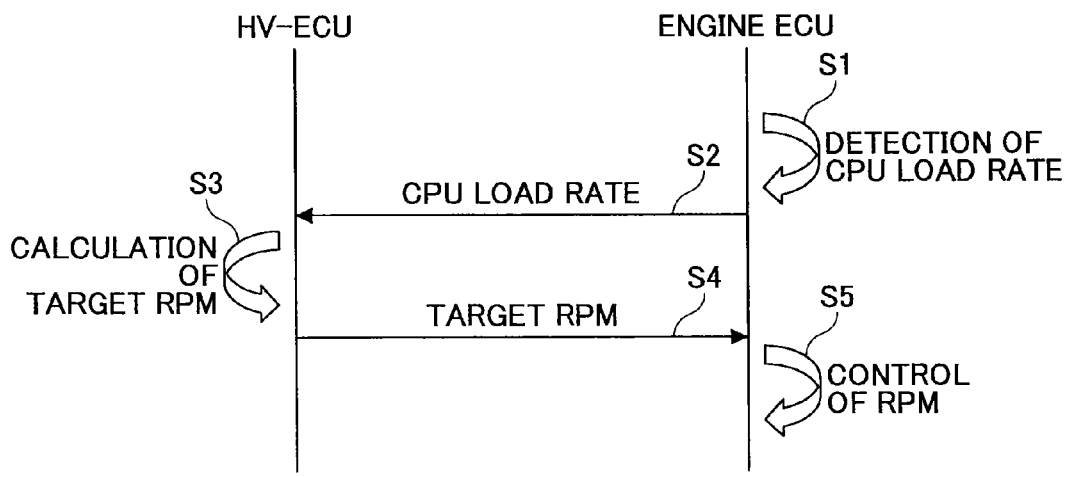
FIG. 8 is a diagram for illustrating an example of a prediction of a CPU load rate.
Figure 8:
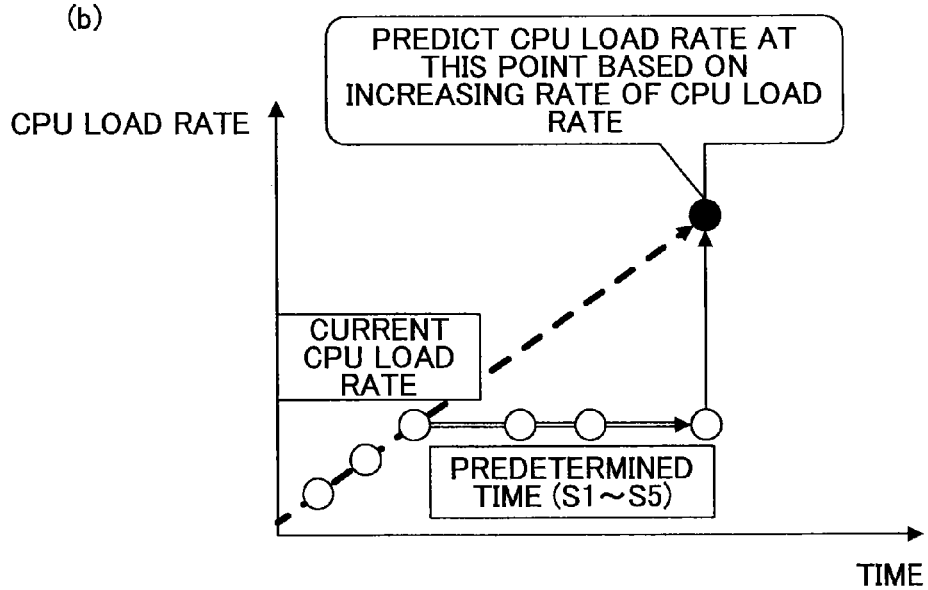

FIG. 8 is a diagram for illustrating an example of a prediction of the CPU load rate. The load rate predicting part 51 predicts, based on the CPU load rate calculated by the load rate monitoring part 71 of the engine ECU 70, the CPU load rate at a time point which is a predetermined time ahead of the present time point. FIG. 8(a) is diagram for illustrating an example of the predetermined time.

(S1) The engine ECU 70 calculates the CPU load rate every unit of time, for example.

(S2) The engine ECU 70 transmits the CPU load rate to the HV-ECU 50.

(S3) Then, the target rpm determining part 52 of the HV-ECU 50 determines the target rpms of the engine 11, the MG1 and the MG2.

(S4) The target rpm determining part 52 transmits the target rpm of the engine 11 to the engine ECU 70 and the target rpms of the MG1 and the MG2 to the MG-ECU 60.

(S5) The engine ECU 70 controls the engine rpm.

In this way, there is a delay from an event of (S1) by which the engine ECU 70 calculates the CPU load rate to an event of (S5) by which the rpm control is performed. For this reason, if the calculated value itself is used without predicting the CPU load rate, the CPU load rate may exceed 100% and the task omission may occur before the rpm control of the engine 11 is performed. Thus, when the load rate predicting part 51 predicts the CPU load rate, the load rate predicting part 51 uses the time required for (S1) through (S5) as the predetermined time.

As a prediction method, a linear approximation with a least squares approximation method is used. The predicted load rate, which is a predicted value of the CPU load rate, can be determined by determining the linear function and calculating the CPU load rate after the predetermined time. It is noted that it is possible to determine a line which connects the latest two points of the CPU load rate to calculate the predicted load rate. Further, a non-linear approximation instead of the linear approximation may be used.

A threshold of the predicted load rate to determine the excessive load may be designed as appropriate. For example, since the predicted load rate exceeding 100% means that there will be the task omission, the HV-ECU 50 may perform the control of reducing the engine rpm using about 100% as a threshold.

[First Embodiment]

In the present embodiment, a control system 100 is described which reduces the engine rpm by moving the engine operating point on the constant power line if the predicted load rate is greater than the threshold.

Figure 9:
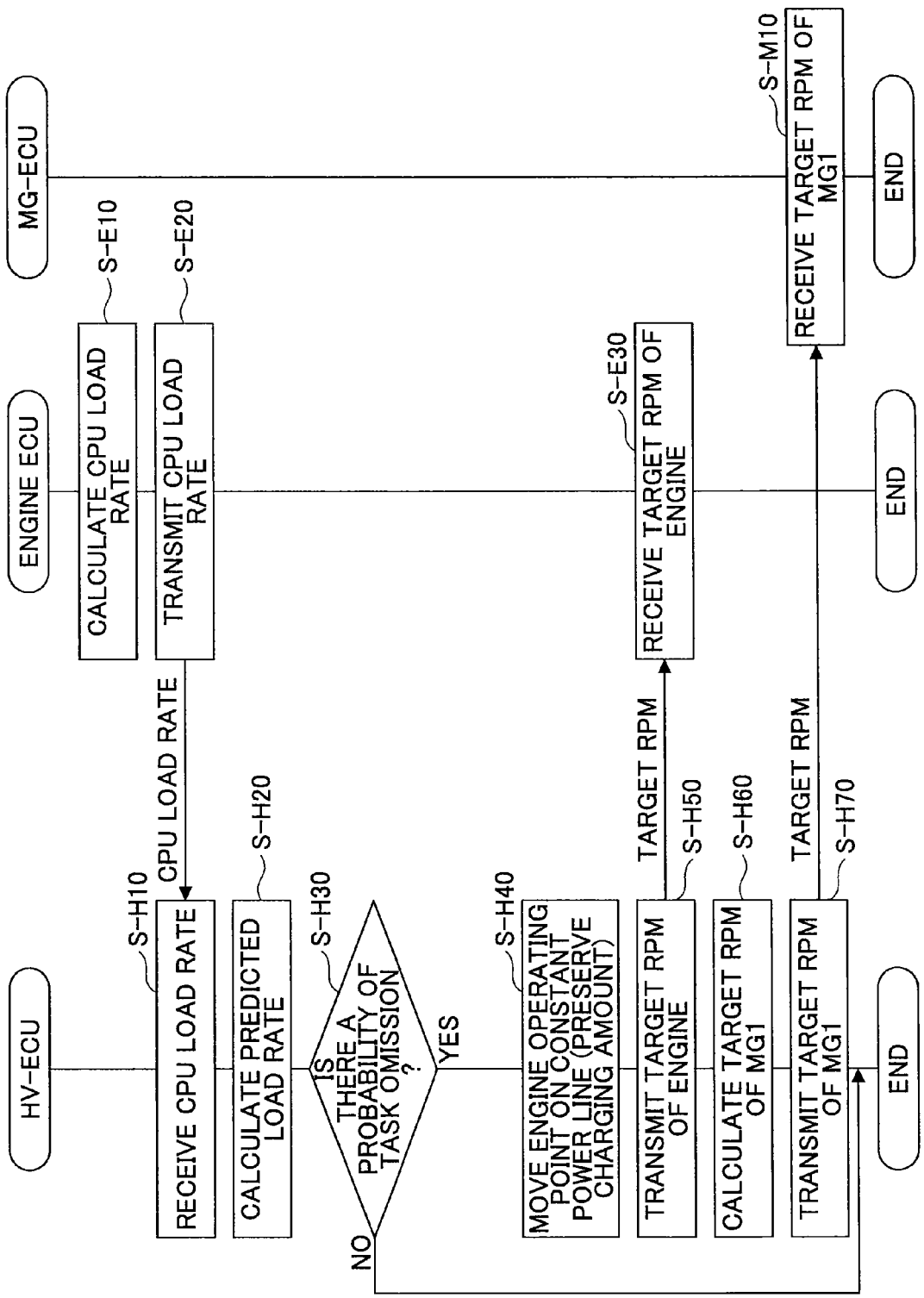
FIG. 9 is a flowchart for illustrating an example of an operational procedure of the control apparatus.
Figure 10:
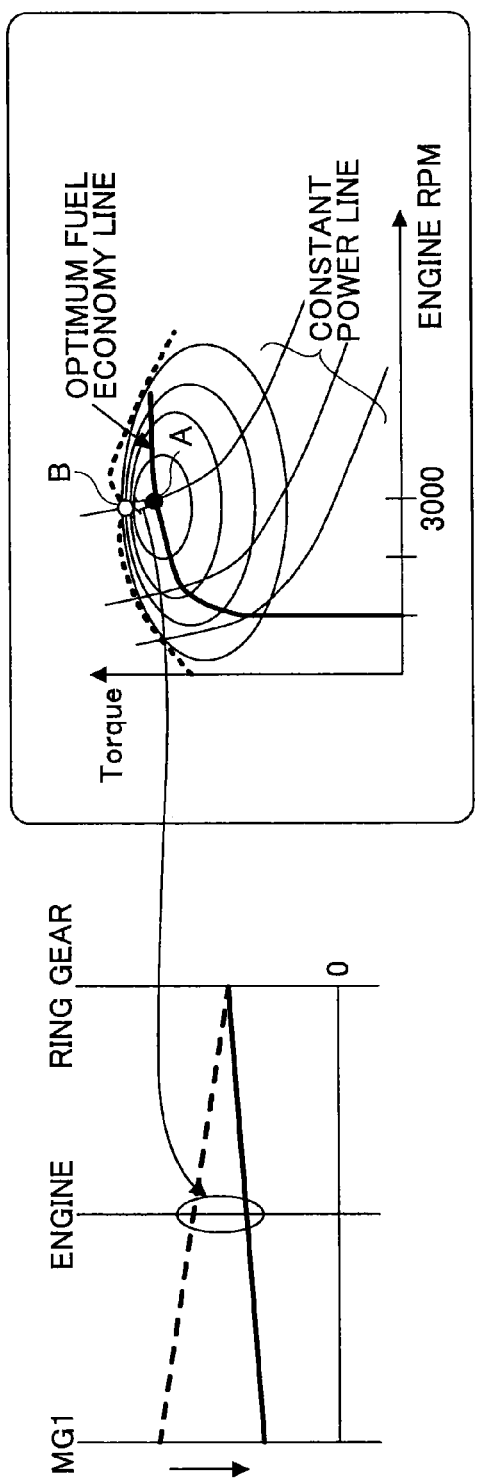
FIG. 10 is a diagram for illustrating an example of control of an engine rpm.

FIG. 9 is a flowchart for illustrating an example of an operational procedure of the control system 100. FIG. 10 is a diagram for illustrating an example of control of the engine rpm.

The process routine illustrated in FIG. 9 is executed in cycles, for example. The load rate monitoring part 71 calculates the CPU load rate at every unit of time, for example (S-E10). The calculation is not necessarily performed at every unit of time. The CPU load rate may be calculated at every predetermined cycle time which is longer than the unit of time.

The load rate monitoring part 71 transmits the CPU load rate to the HV-ECU 50 via the CAN bus (S-E20).

The HV-ECU 50 receives the CPU load rate (S-H10). Then, the HV-ECU 50 uses plural CPU load rates obtained in the past to calculate the predicted load rate after the predetermined time (S-H20).

The target rpm determining part 52 determines whether there is a probability of the task omission (S-H30). Specifically, the predicted load rate is compared with the threshold (100%, for example) and if the predicted load rate is greater than or equal to the threshold, it determines that there is a probability of the task omission.

If there is not a probability of the task omission (No in S-H30), the target rpm determining part 52 determines the demand torque based on the accelerator opening rate and the vehicle speed as usual to determine the target rpms of the engine 11, the MG1 and the MG2.

If there is a probability of the task omission (Yes in S-H30), the target rpm determining part 52 moves the engine operating point on the constant power line (S-H40). As illustrated in FIG. 10, if the latest engine operating point corresponds to a point A, for example, the engine operating point is moved to a point B on the constant power line, for example, such that the engine rpm is reduced. As a result of this, it is possible to reduce the engine rpm and thus the CPU load rate. Theoretically, the engine rpm can be reduced to zero; however, there is a lower limit rpm at which the engine efficiency is bad. Thus, if the engine rpm reaches a predetermined rpm, the reduction of the engine rpm is stopped.

The target rpm determining part 52 transmits the determined target rpm of the engine 11 on the constant power line to the engine ECU (S-H50).

The engine ECU 70 receives the target rpm of the engine 11 (S-E30). As a result of this, the engine rpm is reduced continuously as illustrated in FIG. 10.

The target rpm determining part 52 calculates the target rpm of the MG1 based on the determined target rpm of the engine 11 on the constant power line (S-H60). Specifically, the rpm of the MG1 is calculated based on the target rpm of the engine 11 and the gear ratio k of the power splitter 12.

The target rpm determining part 52 transmits the target rpm of the MG1 to the MG-ECU 60 (S-H70). It is noted that since the target rpm of the MG2 is constant, the MG2 uses the electricity generated by the MG1 to keep the vehicle speed constant.

The engine ECU 60 receives the target rpm of the MG1 (S-M10). As a result of this, as illustrated in FIG. 10, the rpm of the MG1 is reduced on a line connecting the rpm of the ring gear 36 and the rpm of the engine 11. Even if the rpm of the MG1 is reduced, the torque is increased and thus the electricity to be generated is not reduced greatly. Thus, since the target rpm of the MG2 is constant, it is possible to keep the vehicle speed constant while enabling the charging to the battery 15 with the electricity generated by the MG1.

The process routine illustrated in FIG. 9 is executed repeatedly. Thus, if there is not a probability of the task omission, the HV-ECU 50 gradually restores the engine rpm along the constant power line. If there is a probability of the task omission in the course of restoring the engine rpm, the engine rpm is reduced again. On the other hand, if there is not a probability of the task omission in the course of restoring the engine rpm, it is possible to restore the engine rpm on the optimum fuel economy line.

As described above, the control system 100 of the present embodiment reduces the engine rpm if the task omission of the engine ECU 70 is predicted to occur. Therefore, it is possible to prevent the task omission before it occurs. Further, since the engine rpm is reduced such that the engine operating point moves on the constant power line, it is possible to preserve the charging amount.

[Second Embodiment]

In the first embodiment, the engine rpm is reduced while preserving the charging amount; however, there may be a case where the engine operating point is off of the optimum fuel economy line. In the present embodiment, a control system 100 is described which reduces the engine rpm while keeping an optimized status in terms of fuel economy if there is no need to preserve the charging amount.

Figure 11:
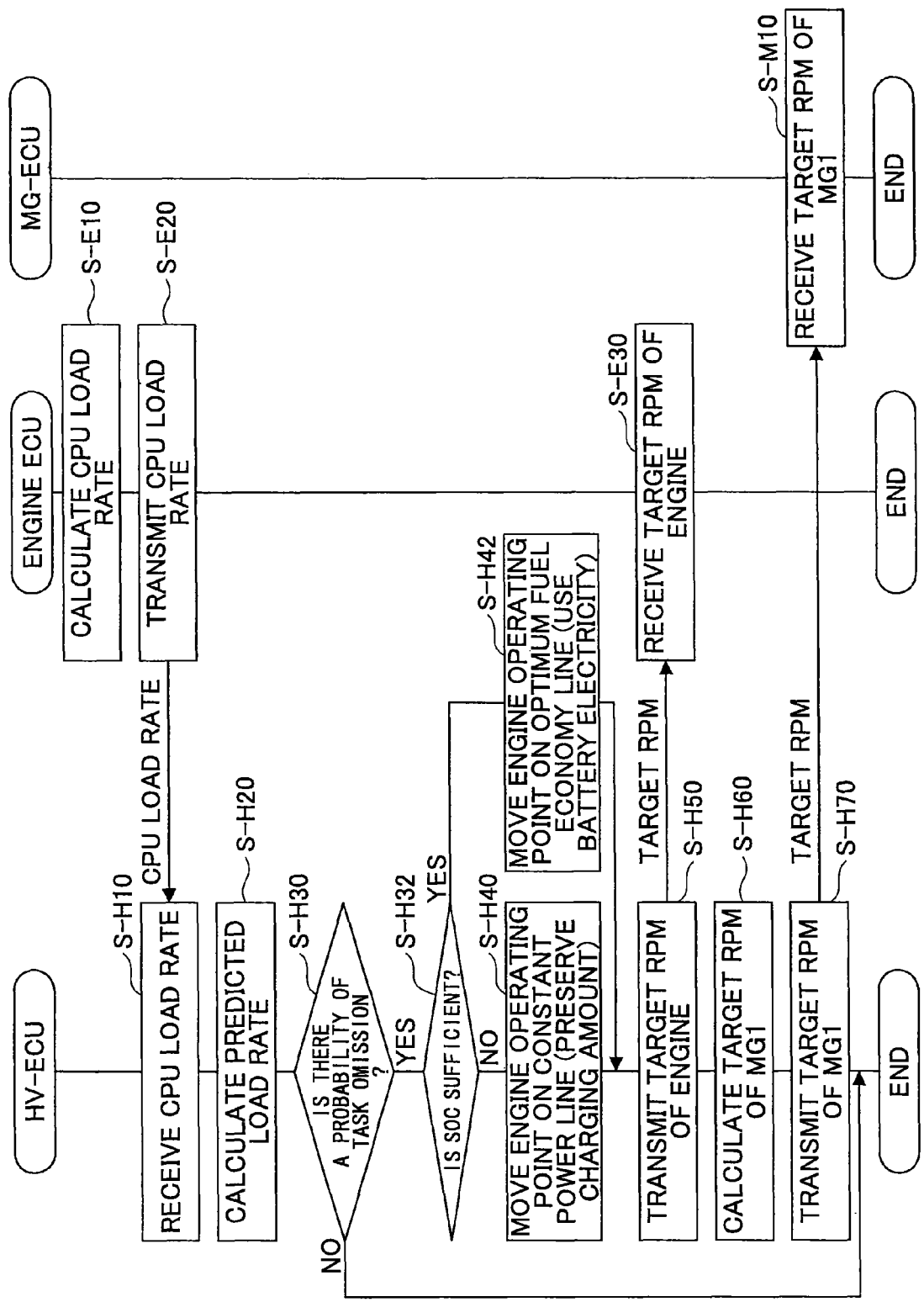
FIG. 11 is a flowchart for illustrating an example of an operational procedure of the control apparatus (second embodiment).
Figure 12:
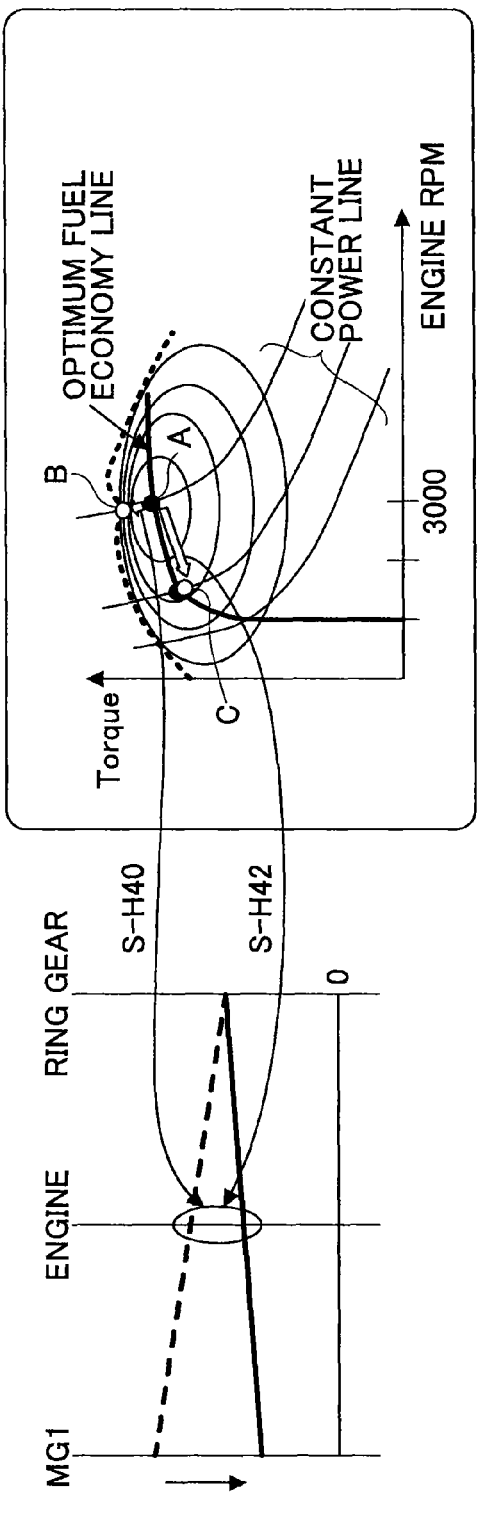
FIG. 12 is a diagram for illustrating an example of control of an engine rpm (second embodiment).

FIG. 11 is a flowchart for illustrating an example of an operational procedure of the control system 100. FIG. 12 is a diagram for illustrating an example of control of the engine rpm. The process routine illustrated in FIG. 11 is substantially the same as the process routine illustrated in FIG. 9, except for the process in the case where it is determined that the there is a probability of the task omission in step S-H30.

If there is not a probability of the task omission (Yes in S-H30), the target rpm determining part 52 determines whether the SOC of the battery 15 is sufficient (S-H32). In other words, it is determined whether a remaining amount of the battery is greater than or equal to a threshold.

If the SOC is not sufficient (No in S-H32), it is necessary to preserve the charging amount.

Thus, the engine operating point is moved on the constant power line (S-H40). This process is the same as that in the first embodiment.

If the SOC is sufficient (Yes in S-H32), it is not necessary to preserve the charging amount. Thus, target rpm determining part 52 moves the engine operating point on the optimum fuel economy line (S-H42). As illustrated in FIG. 12, if the latest engine operating point corresponds to a point A, for example, the engine operating point is moved to a point C on the optimum fuel economy line, for example, such that the engine rpm is reduced. As a result of this, it is possible to reduce the engine rpm and thus the CPU load rate.

The subsequent processes are the same as the first embodiment. Specifically, the target rpm determining part 52 transmits the determined target rpm of the engine 11 to the engine ECU (S-H50). The engine ECU 70 receives the target rpm of the engine (S-E30).

Further, the target rpm determining part 52 calculates the target rpm of the MG1 based on the target rpm of the engine 11 determined in step S-H40 or S-H42 (S-H60).

The target rpm determining part 52 transmits the target rpm of the MG1 to the MG-ECU 60 (S-H70). Since the target rpm of the MG2 is constant, the MG2 uses the electricity generated by the MG1 (in the case of S-H40) or the electricity from the battery 15 (in the case of S-H42) to keep the vehicle speed constant.

The engine ECU 60 receives the target rpm of the MG1 (S-M10). As a result of this, as illustrated in FIG. 12, the rpm of the MG1 is reduced on a line connecting the rpm of the ring gear 36 and the rpm of the engine 11. If the engine rpm is reduced on the constant power line (S-H40), it is possible to keep the vehicle speed while enabling charging the battery 15, as is the case with the first embodiment.

Further, if the engine rpm is reduced on the optimum fuel economy line (S-H42), it is possible to keep the vehicle speed while keeping the optimum fuel economy by using the electricity from the battery 15.

As described above, according to the control system 100 of the present embodiment, in addition to the effects obtained according to the first embodiment, it is possible to reduce the engine rpm along the constant power line or the optimum fuel economy line according to the battery status and reduce the task omission.

The invention claimed is:

1. A control apparatus, comprising:
load predicting circuitry configured to predict, based on current processing load information of engine rpm controlling circuitry, a processing load of the engine rpm controlling circuitry at a time point which is a predetermined time ahead of the present time point, the engine rpm controlling circuitry being configured to control an engine rpm; and
engine rpm reducing circuitry configured to reduce the engine rpm while maintaining a current vehicle speed if the load predicted by the load predicting circuitry is greater than or equal to a first threshold.

2. The control apparatus of claim 1, wherein the engine rpm reducing circuitry reduces the engine rpm such that an engine operating point in a two-dimensional map defined by the engine rpm and an engine torque moves along a constant power line in the two-dimensional map.

3. The control apparatus of claim 1, further comprising:
battery remaining amount detecting circuitry configured to detect a battery remaining amount,
wherein the engine rpm reducing circuitry reduces the engine rpm such that an engine operating point in a two-dimensional map defined by the engine rpm and an engine torque moves along a constant power line in the two-dimensional map, if the battery remaining amount is greater than or equal to a second threshold.

4. The control apparatus of claim 1, further comprising:
battery remaining amount detecting circuitry configured to detect a battery remaining amount,
wherein the engine rpm reducing circuitry reduces the engine rpm such that an engine operating point in a two-dimensional map defined by the engine rpm and an engine torque moves along an optimum fuel economy line in the two-dimensional map, if the battery remaining amount is smaller than a second threshold.

5. The control apparatus of claim 1, wherein the predetermined time is longer than a time from a time point when the current processing load information of the engine rpm controlling circuitry is obtained to a time point when the engine rpm controlling circuitry reduces the engine rpm.

6. A control system comprising an engine rpm controlling apparatus configured to control an engine rpm and a control apparatus configured to transmit the engine rpm to the engine rpm controlling apparatus, wherein
the engine rpm controlling apparatus includes load determining circuitry configured to determine the current processing load of the engine rpm controlling apparatus, and
the controlling apparatus includes
load predicting circuitry configured to predict, based on the current processing load information received from the engine rpm controlling apparatus, a processing load of the engine rpm controlling apparatus at a time point which is a predetermined time ahead of the present time point; and
engine rpm reducing circuitry configured to select the engine rpm which is less than the current engine rpm while maintaining a current vehicle speed if the processing load predicted by the load predicting circuitry is greater than or equal to a first threshold.

7. The control system of claim 6, further comprising:
battery remaining amount detecting circuitry configured to detect a battery remaining amount,
wherein the engine rpm reducing circuitry reduces the engine rpm such that an engine operating point in a two-dimensional map defined by the engine rpm and an engine torque moves along a constant power line in the two-dimensional map, if the battery remaining amount is greater than or equal to a second threshold.

8. The control system of claim 6, further comprising:
battery remaining amount detecting circuitry configured to detect a battery remaining amount,
wherein the engine rpm reducing circuitry reduces the engine rpm such that an engine operating point in a two-dimensional map defined by the engine rpm and an engine torque moves along an optimum fuel economy line in the two-dimensional map, if the battery remaining amount is smaller than a second threshold.

9. The control system of claim 6, further comprising:
generator/motor controlling circuitry configured to control a generator and a motor, the generator being operated by engine output via a power splitter, the motor being operated for driving a vehicle by electric power generated by the generator or electric power from a battery, wherein
the engine rpm reducing circuitry determines a rpm of the generator based on the reduced engine rpm and a current vehicle speed, transmits the determined rpm to the generator/motor controlling circuitry, and instructs the generator/motor controlling circuitry to keep the current vehicle speed with the motor.

* * * * *